UNITED STATES PATENT OFFICE.

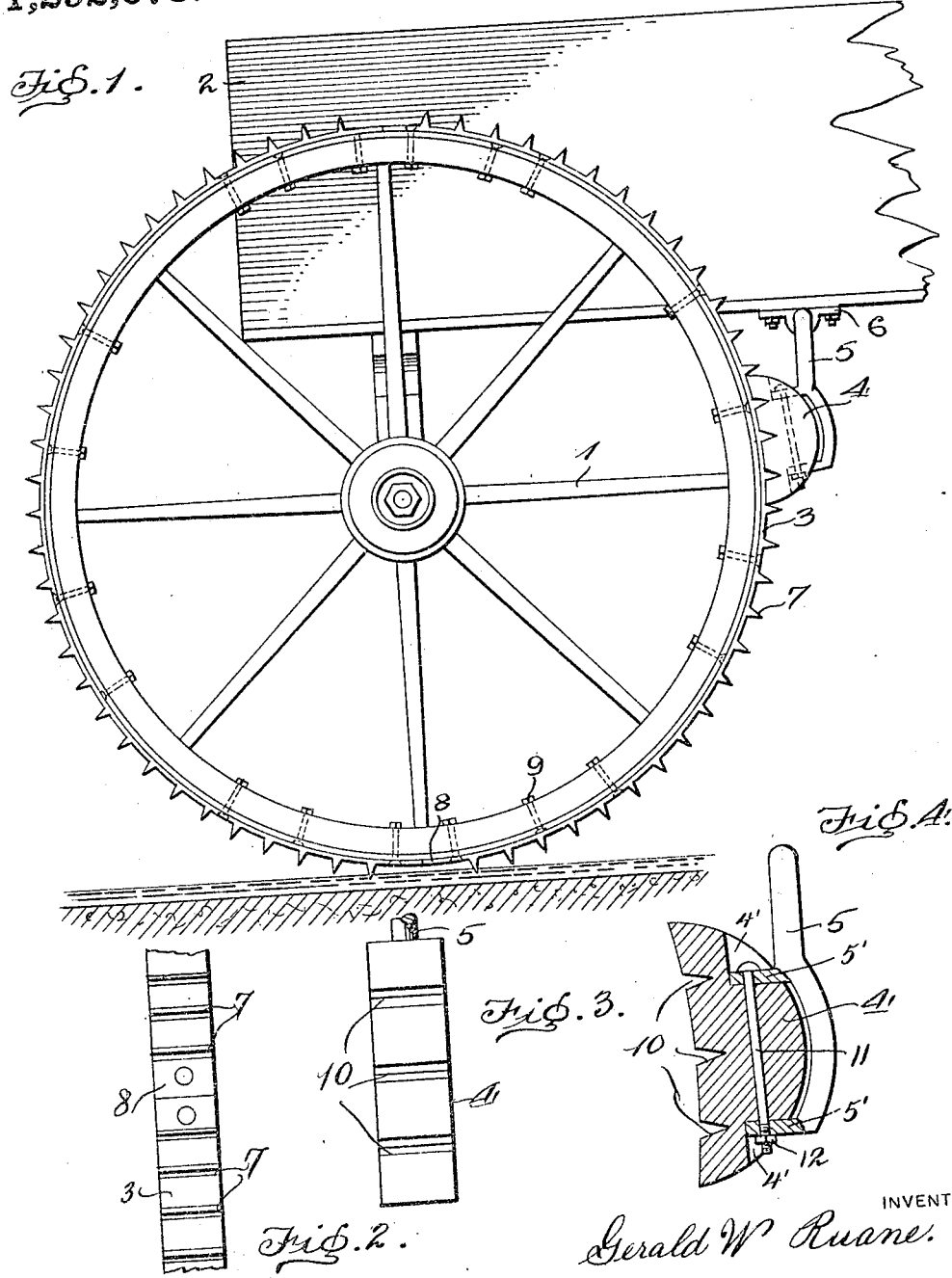

GERALD W. RUANE, OF ARCHBALD, PENNSYLVANIA.

BRAKE.

1,292,078.

Specification of Letters Patent.

Patented Jan. 21, 1919.

Application filed January 21, 1916. Serial No. 73,427.

*To all whom it may concern:*

Be it known that I, GERALD W. RUANE, a citizen of the United States, residing at Archbald, in the county of Lackawanna and State of Pennsylvania, have invented certain new and useful Improvements in Brakes, of which the following is a specification.

This invention is a brake and has for an object the construction of a brake consisting of a hanger and a removable block thereon, thus allowing the block to be removed when it is necessary to replace or change the same for any purpose.

Another object is the production of a brake wherein the block is provided with sockets into which lugs of the hanger extend thus allowing the securing means which passes through the lugs and the block to have its end portion fitting within the recesses and thus be held against accidental injury or displacement.

With these and other objects in view, this invention consists of such novel combinations, construction, and arrangement of parts as will be hereinafter fully described and claimed.

One practical form of construction and assembly of the present invention will be hereinafter described, and is illustrated in the accompanying drawing, in which—

Figure 1 is a side elevation of the device showing the same in operative position, Fig. 2 is a fragmentary detailed view of the serrated tread portion of the detachable tire, Fig. 3 is an end view of the brake block, and Fig. 4 is a sectional view of the brake block taken through its middle and showing the manner of supporting the same.

Referring now more specifically to the drawings, and in connection with which like reference numerals will refer to the same parts in the several views 1 is an ordinary wagon wheel supporting the wagon body 2, and 3 is a supplemental non-skidding tire. 4 designates the brake block pivotally supported by the hanger 5 in suitable bearings 6.

Referring more specifically to the construction of the supplemental tire it will be seen that the same is provided with a series of projections 7 formed integral therewith and which may be made in two sections or of course, if necessary in any number of sections, which construction is at the option of the manufacturer, and therefore does not limit the scope of the invention. The sections are provided with end portions 8, which portions are adapted to receive securing or fastening bolts 9 and thereby fasten the tire to the felly of the wheel 1.

It will be noted that the block 4 is provided with pockets in its ends, as shown at 4' in Fig. 4. The pockets 4' have closed sides and open outer ends. It will further be noted that the inner ends of the pockets 4' are substantially parallel to each other. Accordingly, the lugs 5' of the hanger 5, are constructed parallel and for this reason fit snugly within the pockets 4' by engaging the inner ends of the pockets. The bolt 11 is passed through the lugs and also through the block and has a nut 12 upon its projecting end, it being noted that the head of the bolt and the nut are carried within the pockets 4'. Accordingly, the bolt and nut will be shielded against accidental injury by the striking of a foreign object upon the block and for this reason the nut and bolt may be readily displaced or removed when it is desired to remove the block from the hanger. It will also be noted that it is simply necessary to slip the block into engagement with the hanger lugs by the movement of the lugs into the pockets, since the side walls of the pockets are substantially parallel, as indicated in Figs. 1 and 4 and for this reason the sides of the pockets are closed, and any tendency of the block being displaced by side movement is prevented. Furthermore, as the block is carried contiguous to the periphery of the wheel when in use, the strain upon the bolt is completely relieved, as the inner end of the lugs bear upon the bottoms of the pocket, as shown in Fig. 4, while the side walls of the pockets hold the block against side displacement and accordingly, strain from the bolt is relieved, as above specified.

With reference to the brake block 4, the same is provided upon its concaved face with a series of recesses 10 of substantially the same size and shape as that of the projections or teeth 7 formed upon the tire 3, and which are adapted to receive said teeth when the brake block is operated in such a manner as to provide for the braking or stopping of the wheel 1.

It will be seen that by the foregoing construction, that I have constructed a device which is simple in construction and which may be manufactured at an exceedingly low cost, yet will, in every respect provide a practical and useful attachment.

Having described my invention what I claim is:—

In a device of the class described, the combination of a hanger having parallel lugs extending therefrom, a block having pockets formed in its end, said pockets having closed sides and open ends, the inner walls of said pockets extending in parallel planes, said lugs bearing upon the inner walls and engaging the bottoms of the pockets, the closed sides of the pockets holding the block against side displacement, and securing means projecting through said lugs and block for holding the block against shifting upon said lugs, the ends of said securing means being carried within said pockets to be shielded against accidental injury.

In testimony whereof I affix my signature in presence of two witnesses.

GERALD W. RUANE.

Witnesses:
T. A. THIELSIN,
WILLIAM TRENTLY.

Copies of this patent may be obtained for five cents each, by addressing the "Commissioner of Patents, Washington, D. C."